(12) United States Patent
Field et al.

(10) Patent No.: US 6,333,112 B1
(45) Date of Patent: *Dec. 25, 2001

(54) LAMINATED ONE-WAY CLUTCH

(75) Inventors: Robert H. Field, Bay City; Mark A. Willett, Midland; William T Adams, Shelby Township, all of MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/376,640

(22) Filed: Aug. 18, 1999

Related U.S. Application Data

(63) Continuation-in-part of application No. 08/975,620, filed on Nov. 21, 1997, now Pat. No. 5,972,476.

(51) Int. Cl.$^7$ .............. B32B 9/04; B32B 3/10; F16D 11/06
(52) U.S. Cl. ........ 428/411.1; 428/133; 428/137; 428/174; 192/30 R; 192/41 R
(58) Field of Search .............. 428/99, 133, 137, 428/156, 172, 174, 192, 411.1; 192/30 R, 12 R, 41 R, 3.21, 3.28; 166/237

(56) References Cited

U.S. PATENT DOCUMENTS

| | | |
|---|---|---|
| Re. 29,985 | 5/1979 | Brownhill et al. . |
| 3,086,899 | 4/1963 | Smith et al. . |
| 3,776,335 | 12/1973 | Cadet . |
| 3,876,047 | 4/1975 | Rist . |
| 3,952,849 | 4/1976 | Brownhill et al. . |
| 4,114,019 | 9/1978 | Sandor . |
| 4,662,974 | 5/1987 | Roberts . |
| 4,771,826 | 9/1988 | Grehier et al. . |
| 4,809,831 | 3/1989 | Kinoshita . |
| 4,821,857 | 4/1989 | Groh . |
| 5,070,976 | 12/1991 | Zlotek . |
| 5,070,977 | 12/1991 | Lederman . |
| 5,070,978 | 12/1991 | Pires . |
| 5,349,740 | 9/1994 | Neuenschwander . |
| 5,349,741 | 9/1994 | Neuenschwander . |
| 5,359,763 | 11/1994 | Neuenschwander . |
| 5,373,622 | 12/1994 | Neuenschwander . |
| 5,384,947 | 1/1995 | Kildal et al. . |
| 5,447,772 * | 9/1995 | Flieger ................... 428/99 |
| 5,448,831 | 9/1995 | Harwood . |

\* cited by examiner

Primary Examiner—Donald J. Loney
(74) Attorney, Agent, or Firm—Brooks & Kushman PC

(57) ABSTRACT

A clutch plate, for use with a one-way clutch having a torque-load-transmitting member or "strut" includes a plurality of stacked laminas. At least two of the laminas cooperate to define a load-bearing surface. The load-bearing surface is cooperable with the torque-load-transmitting member to effect one-way torque-load transfer between the strut and the plate. Furthermore, the laminas are secured together to prevent relative movement of any one of the laminas with respect to another of the laminas when the torque-load is transmitted between the strut and the plate.

35 Claims, 6 Drawing Sheets

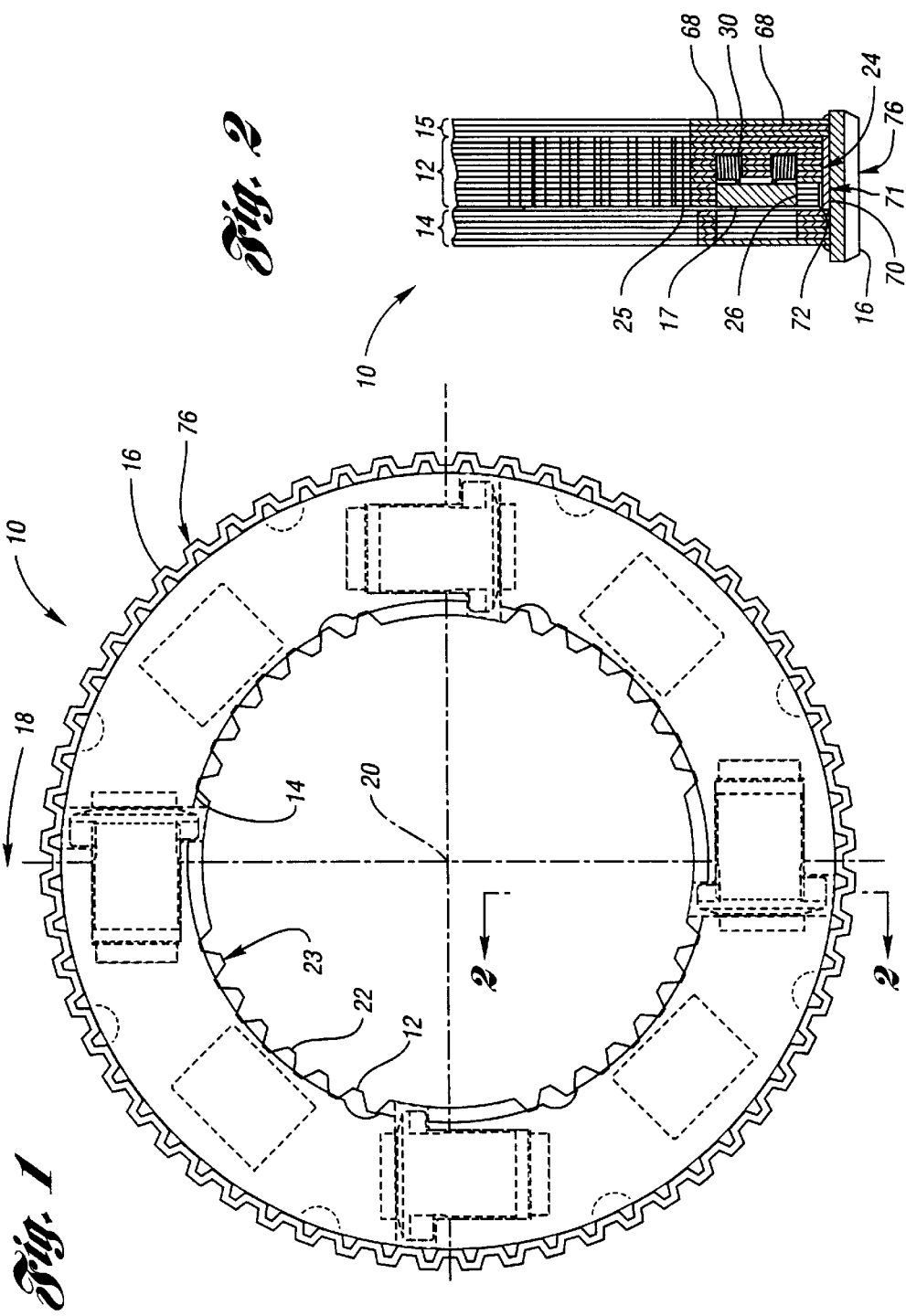

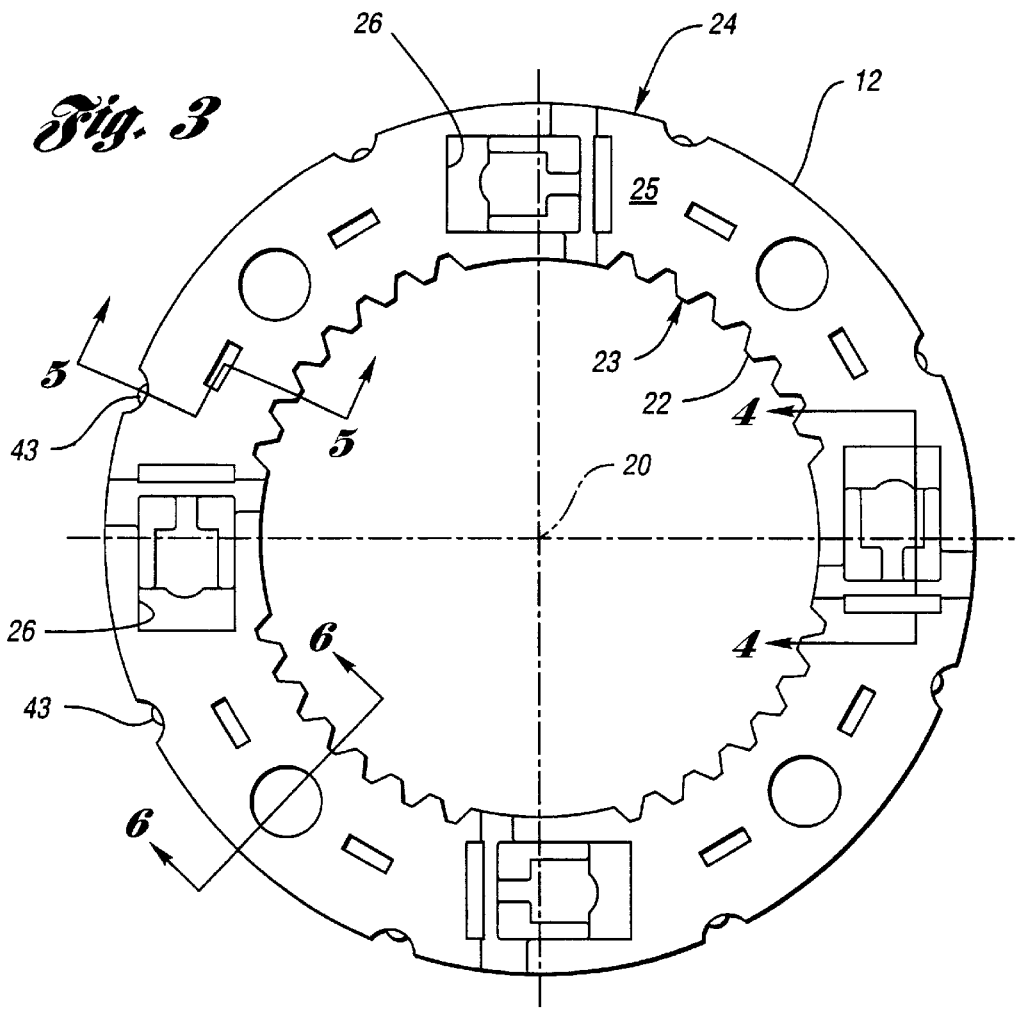
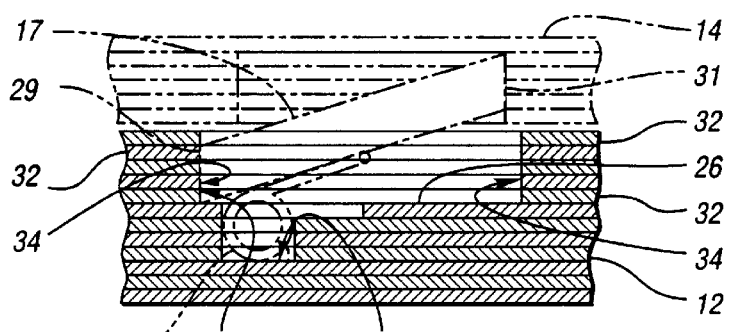
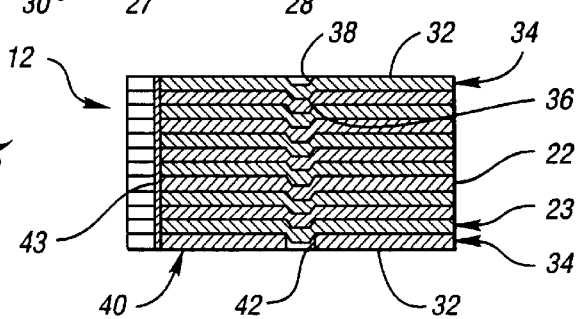

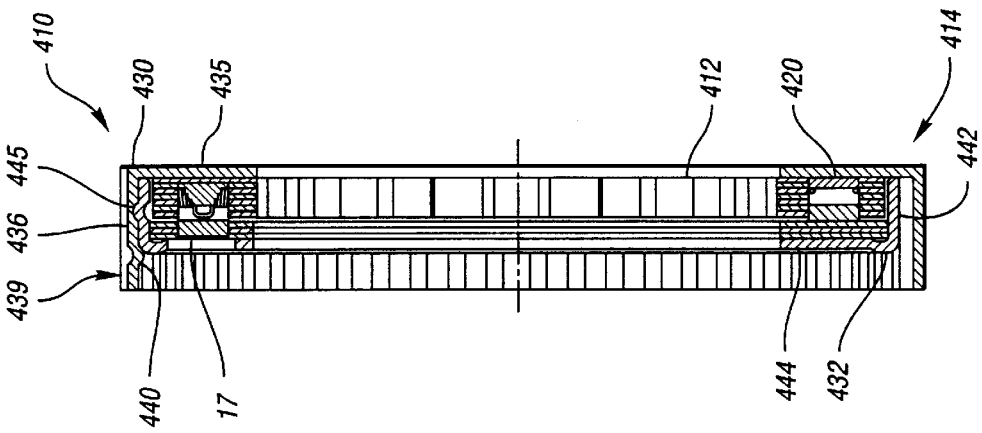
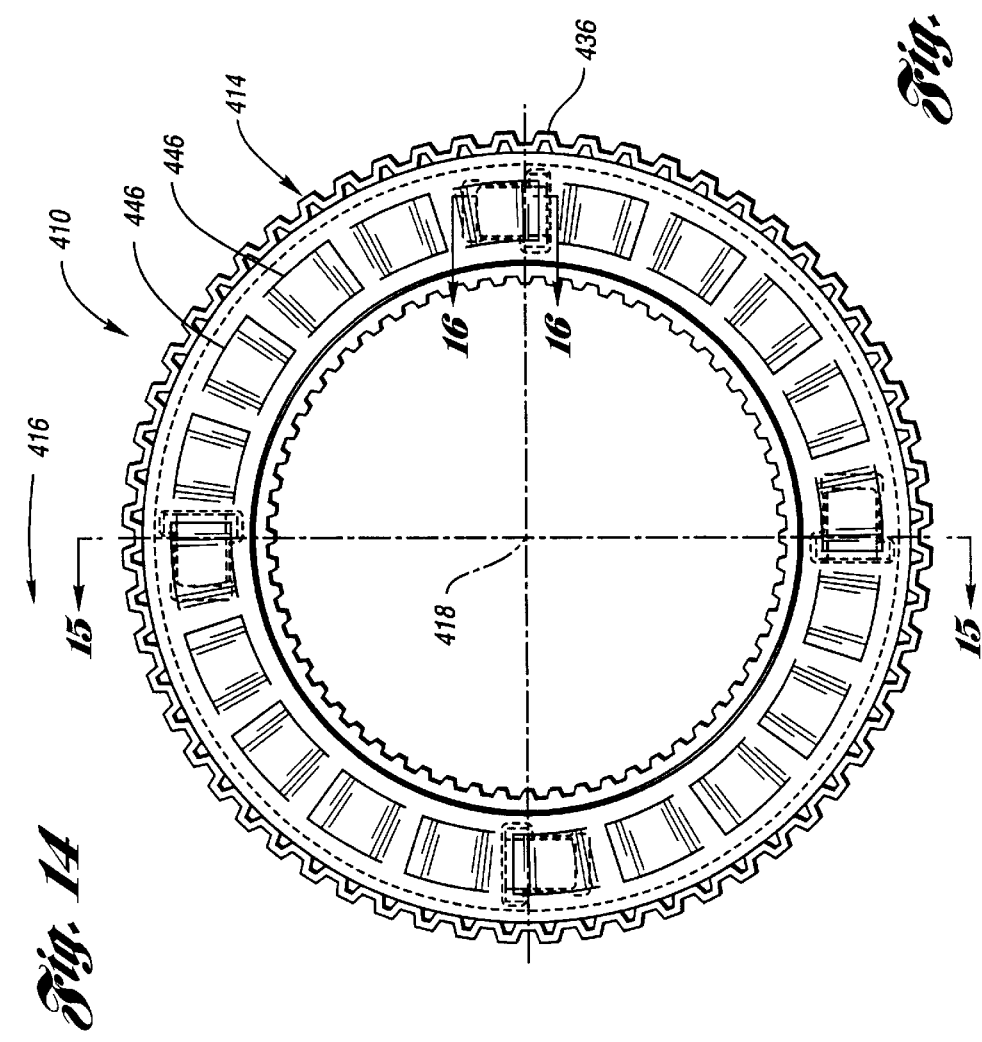

LAMINATED ONE-WAY CLUTCH

CROSS-REFERENCE TO RELATED APPLICATIONS

This is a continuation-in-part of application(s) Ser. No. 08/975,620 filed on Nov. 21, 1997 now U.S. Pat. No. 5,972,476.

TECHNICAL FIELD

The invention relates to one-way clutches for use in mechanisms such as power transmissions, wherein the one-way clutch includes at least one laminated plate.

BACKGROUND ART

Clutches are used in a wide variety of applications to selectively couple power from a first rotatable driving member, such as a driving disk or plate, to a second, independently rotatable driven member, such as a driven disk or plate. In one known variety of clutches, commonly referred to as "one-way" or "overrunning" clutches, the clutch engages to mechanically couple the driving member to the driven member only when the driving member rotates in a first direction relative to the driven member. Once so engaged, the clutch will release or decouple the driven member from the driving member only when the driving member rotates in a second, opposite direction relative to the driven member. Furthermore, the clutch otherwise permits the driving member to freely rotate in the second direction relative to the driven member. Such "freewheeling" of the driving member in the second direction relative to the driven member is also known as the "overrunning" condition.

One type of one-way clutch includes coaxial first and second plates having generally planar clutch faces in closely spaced, juxtaposed relationship. A plurality of recesses or pockets is formed in the face of the first plate at angularly spaced locations about the axis, and a pawl or strut is disposed in each of the pockets. Corresponding notches are formed in the face of the second plate and are engageable with the struts when the first plate is rotating in a driving direction. When the direction of relative rotation of the plates is reversed, the struts disengage the notches in the second plate, thereby allowing freewheeling motion of the first plate with respect to the second plate. Alternatively, the first plate may be provided with the notches, and the second plate may be provided with the pockets.

Each of the first and second plates is typically cast as a single piece from materials such as aluminum and powdered metal. The casting process, however, is relatively expensive and adds significantly to the overall cost of the clutch.

DISCLOSURE OF INVENTION

Accordingly, it is an object of the invention to provide a low cost clutch plate for use with a one-way clutch, wherein the clutch plate includes a plurality of stacked laminas that are secured together to prevent relative laminar movement.

Another object of the invention is to provide such a clutch plate having improved strength as compared with prior art clutch plates.

Still another object of the invention is to provide a one way clutch including at least one plate having a plurality of stacked laminas, wherein the laminas are secured together to prevent relative laminar movement.

In accordance with the invention, a clutch plate adapted for use with a one-way clutch having a torque-load-transmitting member comprises a plurality of stacked laminas. At least two of the laminas cooperate to define a load-bearing surface. The load-bearing surface is cooperable with the torque-load-transmitting member to effect one-way torque-load transfer between the torque-load-transmitting member and the plate. Furthermore, the laminas are secured together to prevent relative movement of any one of the laminas with respect to another of the laminas when the torque-load is transmitted between the torque-load-transmitting member and the plate.

In one embodiment, a plurality of projections and complementary recesses are formed in several of the lamina such that, when stacked, the projections and recesses of adjacent lamina are placed in an interference fit to inhibit relative laminar movement. Furthermore, the plate includes at least one engaging member, such as a pin, disposed within the plurality of stacked laminas and engageable with at least two laminas to further inhibit relative laminar movement.

A one-way clutch according to the invention comprises a first plate having a first load-bearing surface, and a second plate including a plurality of stacked laminas. At least two of the laminas cooperates to define a load-bearing surface. The clutch further includes a torque-load-transmitting member that cooperates with the load-bearing surfaces to effect one-way torque-load transfer between the plates. Additionally, the laminas are secured together to prevent relative movement of any one of the laminas with respect to another of the laminas when the torque-load is transmitted between the plates.

In one embodiment, the torque-load-transmitting member is a strut, and the first plate has a pocket for carrying the strut. The pocket has a pocket engaging surface engageable with the strut and cooperable with the first load-bearing surface to effect torque-load transfer therebetween. The second plate has a notch alignable with the pocket. The notch includes a notch engaging surface engageable with the strut and cooperable with the second load-bearing surface to effect torque-load transfer therebetween.

In another embodiment, the torque-load-transmitting member is a strut, and the first plate has a notch. The notch includes a notch engaging surface engageable with the strut and cooperable with the first load-bearing surface to effect torque-load transfer therebetween. The second plate has a pocket alignable with the notch for carrying the strut. The pocket further includes a pocket engaging surface engageable with the strut and cooperable with the second load-bearing surface to effect torque-load transfer therebetween.

The foregoing and other objects, features and advantages of the present invention will be more readily apparent to those skilled in the art after review of the best mode for carrying out the invention, taken in conjunction with the accompanying drawings.

BRIEF DESCRIPTION OF DRAWINGS

FIG. 1 is a front view of a first exemplary one-way clutch according to the invention;

FIG. 2 is a cross-sectional view of the one-way clutch taken along line 2—2 in FIG. 1, and showing a first plate having a first-plate clutch face, a second plate having a second-plate clutch face, a third plate and a splined drum, wherein the first plate and the third plate are secured to the drum with the second plate disposed therebetween;

FIG. 3 is a front view of the first plate showing the first-plate clutch face and a plurality of strut pockets;

FIG. 4 is a fragmentary cross-sectional view of the first plate taken along line 3—3 of FIG. 3, with the second plate and a strut shown in phantom;

FIG. 5 is a cross-sectional view of the first plate taken along line 5—5 of FIG. 3 and showing a plurality of stacked laminas secured together;

FIG. 14 is a front view of a fifth exemplary one-way clutch according to the invention;

FIG. 15 is a cross-sectional view of the fifth exemplary one-way clutch taken along line 15—15 of FIG. 14.

BEST MODE FOR CARRYING OUT THE INVENTION

Figure 6:
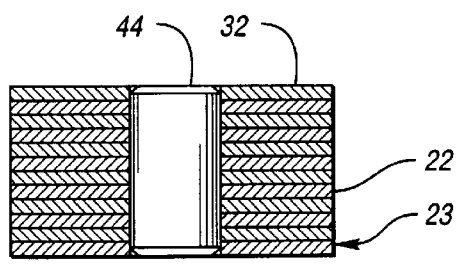
FIG. 6 is a cross-sectional view of the first plate taken along line 6—6 of FIG. 3 and showing an engaging member disposed within the plurality of stacked laminas.

FIGS. 1 and 2 show a first exemplary one-way clutch 10 including a driving member or first plate 12, a driven member or second plate 14, a retaining member or third plate 15, a splined drum 16, and a plurality of torque-load-transmitting members, such as struts 17. The struts 17 operate to mechanically couple the first plate 12 to the second plate 14 only when the first plate 12 rotates in a first direction 18 about an axis 20. Alternatively, the first plate 12 may function as the driven member, and the second plate 14 may function as the driving member.

As shown in FIG. 3, the first plate 12 has a splined central opening 22 that defines a first-plate load-bearing surface 23, and an outer surface 24. In this example, the first-plate load bearing surface 23 also functions as a first-plate engaging surface for receiving rotational input from a cooperating drive shaft (not shown) or other suitable arrangement. The first plate 12 further includes a generally planar clutch face 25 having a plurality of strut pockets 26 disposed at angularly spaced positions about the axis 20. As shown in FIG. 4, each strut pocket 26 has a pocket load-bearing surface 27, which also functions as a pocket engaging surface in this example, and one or more additional internal surfaces such as as an end surface 28. As shown in phantom in FIG. 4, one torque-load-transmitting strut 17 is disposed in each of the pockets 26, and a first end 29 of each strut 17 is engageable with a respective pocket engaging surface. A spring 30, which is also shown in phantom in FIG. 4, is preferably disposed beneath each strut 17 for urging a second, free end 31 of each strut out of its respective pocket 26.

As seen in FIGS. 4 through 6, the first plate 12 has a plurality of stacked laminas 32. Each of the laminas 32 has a plurality of laterally-disposed surfaces 34 and a plurality of downward interlocking projections 36 and opposed complimentary recesses 38, with the exception that the lamina 32 forming an end surface 40 of the first plate 12 is provided with a plurality of openings 42 in lieu of any interlocking projections 36.

The laminas 32 cooperate to define the opening 22 and the pockets 26. Preferably, the laterally-disposed surfaces 34 of at least two of the laminas 32 cooperate to define the first-plate load-bearing surface 23 and the pocket load-bearing surfaces 27. The laterally-disposed surfaces 34 that cooperate to define one of the load-bearing surfaces 23 and 27 may be disposed on the same or different laminas 32 as compared with the laterally-disposed surfaces 34 that define another of the load-bearing surfaces 23 and 27. Furthermore, the lamina 32 that defines the end surface 28, or other internal surface, of each pocket 26 may or may not be one of the laminas 32 whose laterally-disposed surfaces 34 define a respective pocket load-bearing surface 27.

The recesses 38 of each lamina 32 and the openings 42 of the lamina 32 forming the end surface 40 of the first plate 12 are sized and shaped to be engageable with the corresponding projections 36 of an immediately adjacent lamina 32, as shown in FIG. 5. Thus, the projections 36 cooperate with the recesses 38 and openings 42 to lock the laminas 32 together to prevent relative movement of any one of the laminas 32 with respect to another of the laminas 32 when a torque-load is transmitted between the first plate 12 and the second plate 14, and/or when a torque-load is transmitted between the first-plate load-bearing surface 23 and at least one of the pocket load-bearing surfaces 27. While the invention contemplates providing projections 36, recesses 38 and openings 42 of any suitable shape, the projections 36, recesses 38 and openings 42 are preferably generally rectangular. In addition, the laminas 32 may be laser welded together, whereby at least one weld bead 43 is formed, to further prevent relative laminar movement. Furthermore, as shown in FIG. 6, at least one engaging member such as a pin 44 may be disposed in the plurality of stacked laminas 32 to further prevent relative laminar movement and to distribute torque-load over multiple laminas. Alternatively, the laminas 32 may be secured together using one or more of the previously described methods, or the laminas 32 may be secured together in any suitable manner.

Obviously, the number of laminas 32 and the thickness of each lamina 32 may vary depending on the application. While the laminas 32 may be formed in any manner, the laminas 32 are preferably stamped from thin strip stock material. By way of example only, the laminas 32 are preferably stamped using a punch and die from a strip of pre-hardened generally planar steel strip stock.

Figure 7:
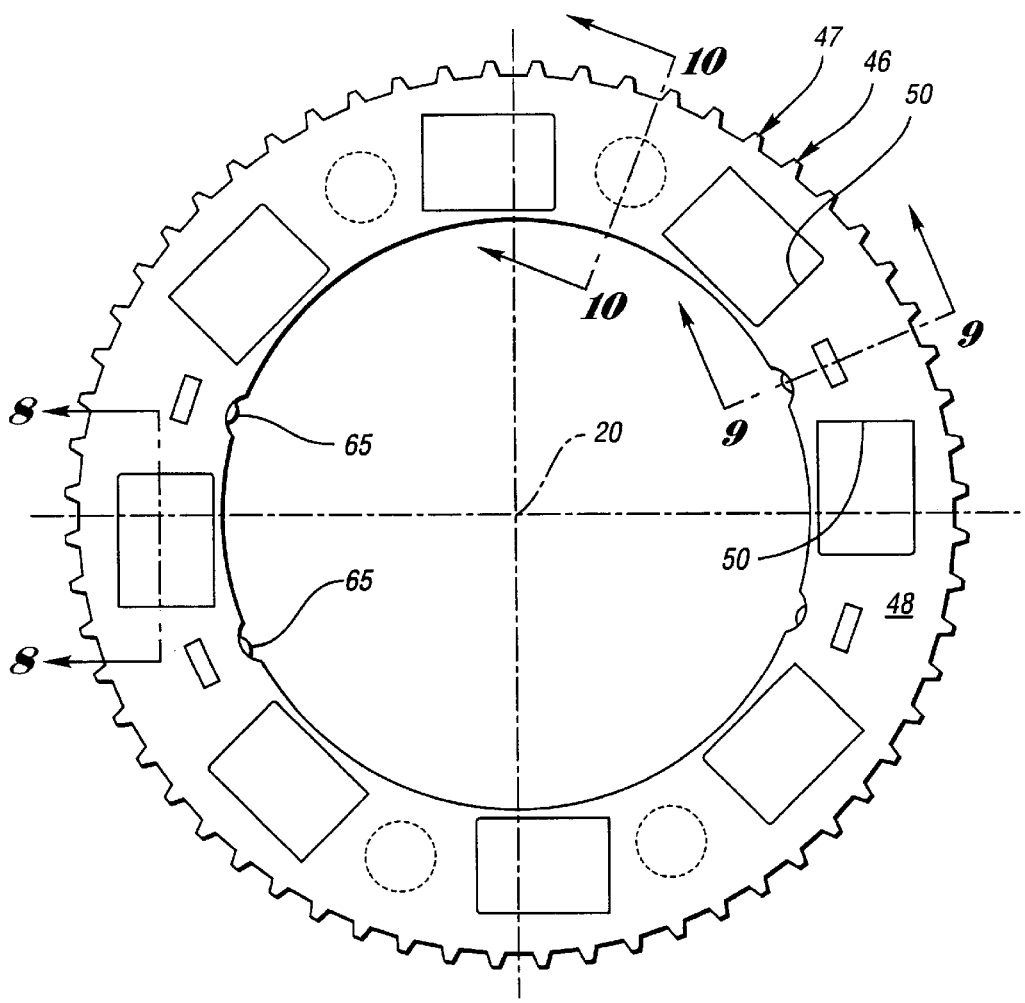
FIG. 7 is a back view of the second plate showing the second-plate clutch face and a plurality of notches.
Figure 8:
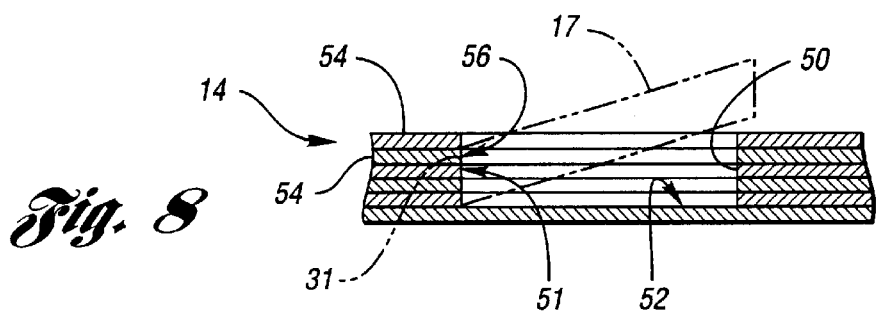
FIG. 8 is a fragmentary cross-sectional view of the second plate taken along line 8—8 of FIG. 7, with a strut shown in phantom.

As shown in FIG. 7, the second plate 14 has a splined outer surface 46 that defines a second-plate load-bearing surface 47. The second plate 14 further includes a generally planar clutch face 48 having a plurality of recesses or notches 50 disposed at angularly spaced positions about the axis 20. As shown in FIG. 8, each of the notches 50 has a notch load-bearing surface 51, which also functions as a notch engaging surface in this example, and one or more additional internal surfaces such as an end surface 52. The notch engaging surfaces are selectively engageable with the free ends 31 of the struts 17 for transmitting torque-load between the first plate 12 and the second plate 14.

Figure 9:
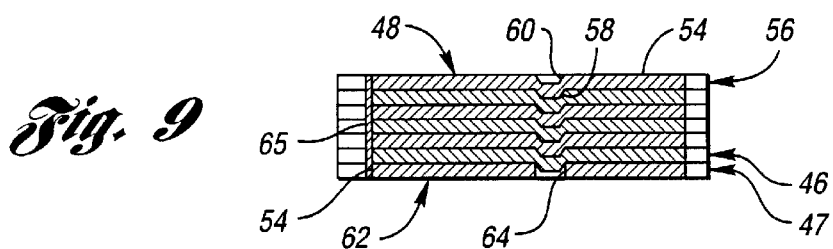
FIG. 9 is a cross-sectional view of the second plate taken along line 9—9 of FIG. 8 and showing a plurality of stacked laminas secured together.
Figure 10:
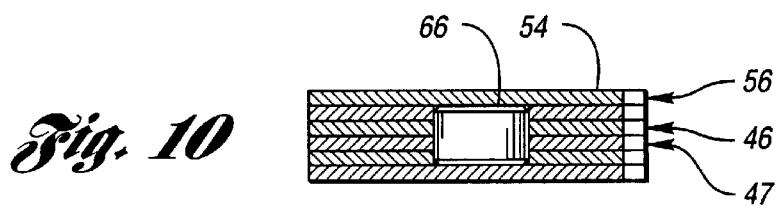
FIG. 10 is a cross-sectional view of the second plate taken along line 10—10 of FIG. 7 and showing an engaging member disposed within the plurality of stacked laminas.

As seen in FIGS. 8 through 10, the second plate 14 also has a plurality of stacked laminas 54. Each of the laminas 54 has a plurality of laterally-disposed surfaces 56 and a plurality of downward interlocking projections 58 and opposed complimentary recesses 60, with the exception that the lamina 54 forming an end surface 62 of the notch plate 14 is provided with a plurality of openings 64 in lieu of any interlocking projections 58.

The laminas 54 cooperate to define the outer surface 46 and the notches 50. Preferably, the laterally-disposed surfaces 56 of at least two of the laminas 54 cooperate to define the second-plate load-bearing surface 47 and the notch load-bearing surfaces 51. The laterally-disposed surfaces 56 that cooperate to define one of the load-bearing surfaces 47 and 51 may be disposed on the same or different laminas 54 as compared with the laterally-disposed surfaces 56 that define another of the load-bearing surfaces 47 and 51. Furthermore, the lamina 54 that defines the end surface 52, or other internal surface, of each notch 50 may or may not be one of the laminas 54 whose laterally-disposed surfaces 56 define a respective notch load-bearing surface 51.

The projections 58, recesses 60 and openings 64 function in a manner similar to the projections 36, recesses 38 and openings 42 of the first plate 12. Thus, the projections 58 cooperate with the recesses 60 and openings 64 to lock the laminas 54 together to prevent relative movement of any one of the laminas 54 with respect to another of the laminas 54 when a torque-load is transmitted between the first plate 12 and the second plate 14, and/or when a torque-load is transmitted between the second-plate load-bearing surface 47 and at least one of the notch load-bearing surfaces 51. In addition, the laminas 54 may be laser welded together, whereby at least one weld bead 65 is formed, to further prevent relative laminar movement. Furthermore, as shown in FIG. 10, at least one engaging member such as a pin 66 may be disposed in the plurality of stacked laminas 54 to further prevent relative laminar movement and to distribute torque-load over multiple laminas. As further shown in FIG. 10, the pin 66 may be encapsulated by the plurality of stacked laminas 54. Alternatively, the laminas 54 may be secured together using one or more of the previously described methods, or the laminas 54 may be secured together in any suitable manner.

Obviously, the number of laminas 54 and the thickness of each lamina 54 may vary depending on the application. Furthermore, the laminas 54 are formed in a manner similar to the laminas 32.

Returning to FIG. 2, the third plate 15 also includes a plurality of stacked laminas 68 that are secured together in a manner similar to that described with respect to the first plate 12 and the second plate 14. Alternatively, the third plate 15 may be provided as a single piece. The third plate 15 and the second plate 14 are preferably welded to the drum 16 with the pocket plate 12 and a spacer, such as a spacer ring 70, therebetween. Alternatively, the third plate 15 and the second plate 14 may be secured to the drum 16 in any suitable manner. The spacer ring 70 preferably has a splined outer surface 71 that engages the drum 16 for rotation therewith. The spacer ring 70 spaces the second plate 14 sufficiently away from the first plate 12 so as to create a gap 72 between the second plate 14 and the first plate 12. Furthermore, the spacer ring 70 prevents the outer surface 24 of the first plate 12 from contacting the drum 16, and allows the first plate 12 to rotate freely with respect to the drum 16 when the first plate 12 rotates in a second direction opposite the first direction 18.

The drum 16 defines an outer, lateral engaging surface 76 that is engageable with an external arrangement (not shown) for transmitting torque-load to the external arrangement. The drum 16 may be formed of any suitable material, such as steel strip stock, and in any suitable manner, such as by passing the strip stock through a spline roller.

Alternatively, the first plate 12 may be configured as a notch plate, and the second plate 14 may be configured as a pocket plate. Furthermore, the retaining member may be any suitable retaining device such as a weir or snap ring.

In accordance with a feature of the invention, because the plates 12 and 14 are preferably formed with stamped laminas, expensive casting operations are not required. Furthermore, the plates 12 and 14 formed with such stamped laminas have improved strength as compared with plates made from cast powdered metal.

Figure 11:
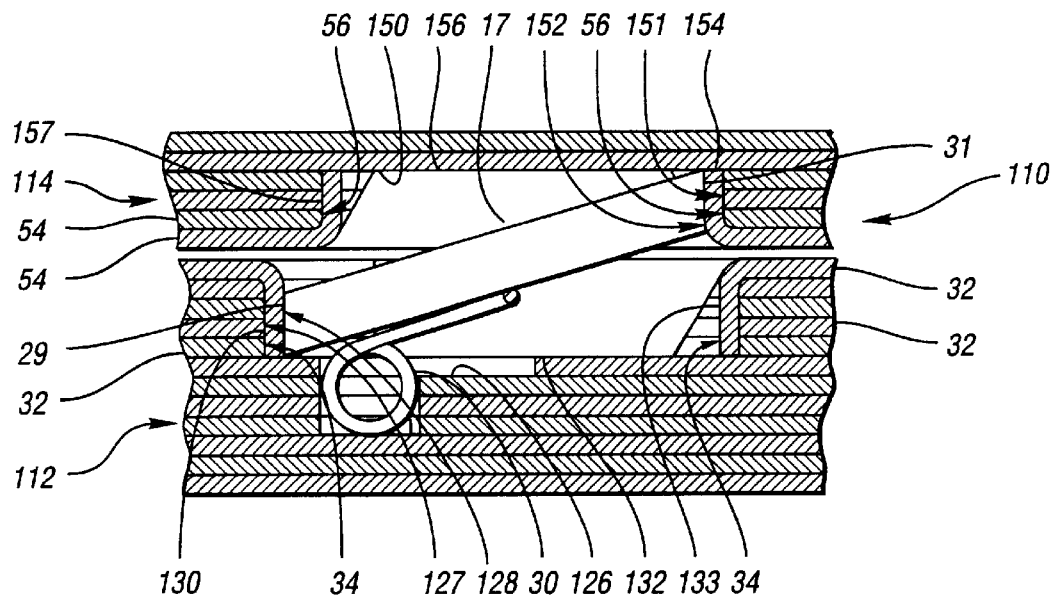
FIG. 11 is a fragmentary cross-sectional view, similar to FIG. 3, of a second exemplary one-way clutch according to the invention.

FIG. 11 shows a second exemplary one-way clutch 110 including a first plate 112 and a second plate 114. As with the first plate 12, the first plate 112 includes a plurality of stacked laminas 32 that cooperate to define a plurality of pockets 126 for carrying the struts 17, and a plurality of pocket load-bearing surfaces 127. Preferably, similar to the pocket plate 12, the laterally-disposed surfaces 34 of at least two of the laminas 32 cooperate to define the load-bearing surfaces 127 of the first plate 112. By contrast, however, one of the laminas 32 has tabs 130, 132 and 133 that are bent over at least another lamina 32 to define at least a portion of each of the pockets 126. Each of the tabs 130 is engaged with a respective load-bearing surface 127, and functions to distribute torque-load over the load-bearing surface 127. Furthermore, each of the tabs 130 defines a generally smooth pocket engaging surface 128 that is engageable with the first end 29 of a respective strut 17. The tabs 132 and 133 define generally smooth internal surfaces of each of the pockets 126, and the smooth surfaces allow the second ends 31 of the struts 17 to travel freely in and out of the pockets 126.

The second plate 114 has a plurality of notches 150, wherein each of the notches has a notch load-bearing surface 151 and a notch engaging surface 152 that is engageable with the second ends 31 of the struts 17. As with the second plate 14, the second plate 114 includes a plurality of stacked laminas 54 that cooperate to define a plurality of recesses or notches 150 and a plurality of notch load-bearing surfaces 151. Preferably, the laterally-disposed surfaces 56 of at least two of the laminas 54 cooperate to define the load-bearing surfaces 151 of the second plate 114. By contrast, however, one of the laminas 54 has tabs 154, 156 and 157 that are bent over at least another lamina 54 to define at least a portion of each of the notches 150. Each of the tabs 154 is engaged with a respective notch load-bearing surface 151, and functions to distribute torque-load over the load-bearing surface 151. Furthermore, each of the tabs 154 defines a notch engaging surface 152 that is selectively engageable with the second ends 31 of the struts 17. The tabs 156 and 157 define generally smooth internal surfaces of each of the notches 150.

Figure 12:
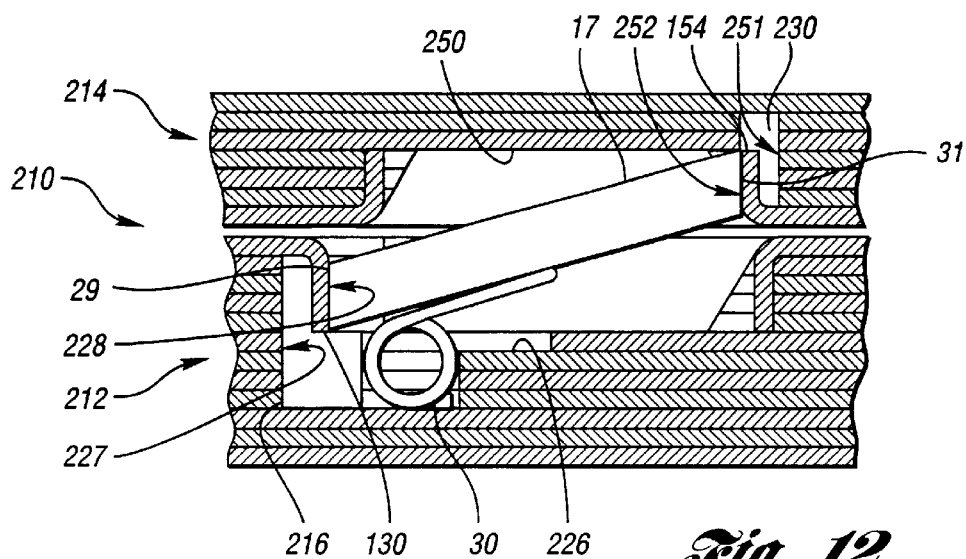
FIG. 12 is a fragmentary cross-sectional view, similar to FIG. 11, of a third exemplary one-way clutch according to the invention.

FIG. 12 shows a third exemplary one-way clutch 210 including a first plate 212 and a second plate 214. The first plate 212 is similar to the first plate 112, but further includes a plurality of inserts 216 that define at least a portion of each of a plurality of strut pockets 226. The inserts 216 are secured to the pocket plate 212 by the tabs 130, and function to distribute torque-load over a larger pocket load-bearing surface 227 as compared with the pocket load-bearing surface 127. Advantageously, each of the inserts 216 also functions to inhibit relative laminar movement. Furthermore, each of the tabs 130 defines a pocket engaging surface 228 that is engageable with the first end 29 of a respective strut 17. The inserts 216 are preferably made of cast powdered metal, but they may be made of any suitable material such as cast aluminum.

The second plate 214 is similar to the second plate 114, but further includes a plurality of inserts 230 that may or may not form a portion of each of a plurality of recesses or notches 250. The inserts 230 function to distribute torque-load over a larger notch load-bearing surface 251 as compared with the notch load-bearing surface 151, and further function to inhibit relative laminar movement. The inserts 230 are secured to the second plate 214 by the tabs 154, and each of the tabs 154 defines a notch engaging surface 252 that is selectively engageable with the second ends 31 of the struts 17. The inserts 230 are preferably made of cast powdered metal, but they may be made of any suitable material such as cast aluminum.

Figure 13:
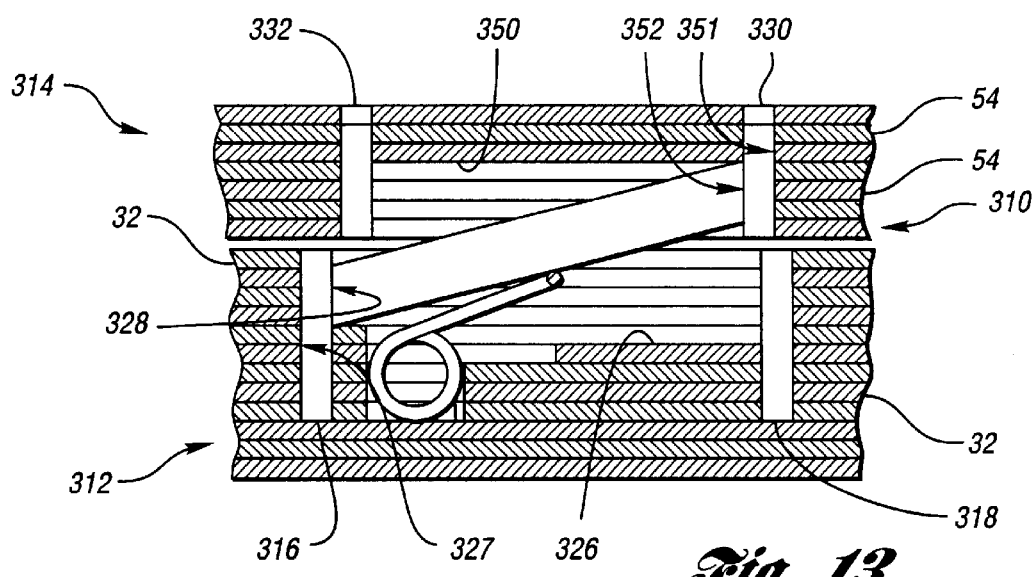
FIG. 13 is a fragmentary cross-sectional view, similar to FIG. 12, of a fourth exemplary one-way clutch according to the invention.

FIG. 13 shows a fourth exemplary one-way clutch 310 including a first plate 312 and a second plate 314. The first plate 312 includes a plurality of first and second inserts 316 and 318, respectively, that define at least a portion of each of a plurality of strut pockets 326. Similar to the first plate 212, the pocket plate 312 includes a plurality of laminas 32 that define the remainder of the pockets 326, and further define each of a plurality of pocket load-bearing surfaces 327. Each of the first inserts 316 is engaged with a respective load-bearing surface 327, and functions to distribute torque-load over the respective load-bearing surface 327. Furthermore, each of the first inserts 316 defines a pocket engaging surface 328 that is engageable with the first end 29 of a respective strut 17. The inserts 316 and 318 are preferably snap-fit into the plurality of laminas 32, and further function to inhibit relative laminar movement. Alternatively or supplementally, the inserts 316 and 318 may be secured to the plurality of laminas 32 in any suitable manner such as by welding the inserts 316 and 318 to one or more laminas 32. The inserts 316 and 318 are preferably made of cast powdered metal, but they may be made of any suitable material such as cast aluminum.

The second plate 314 also includes a plurality of first and second inserts 330 and 332, respectively, that define at least a portion of each of a plurality of recesses or notches 350. Similar to the second plate 214, the second plate 314 includes a plurality of laminas 54 that define the remainder of the notches 350, and further define each of a plurality of notch load-bearing surfaces 351. Each of the first inserts 330 is engaged with a respective notch load-bearing surface 351, and functions to distribute torque-load over the respective load-bearing surface 351. Furthermore, each of the first inserts 330 defines a notch engaging surface 352 that is selectively engageable with the second ends 31 of the struts 17. The inserts 330 and 332 are preferably snap-fit into the plurality of laminas 54, and further function to inhibit relative laminar movement. Alternatively or supplementally, the inserts 330 and 332 may be secured to the plurality of laminas 54 in any suitable manner such as by welding the inserts 330 and 332 to one or more laminas 54. The inserts 330 and 332 are preferably made of cast powdered metal, but they may be made of any suitable material such as cast aluminum.

Figure 16:
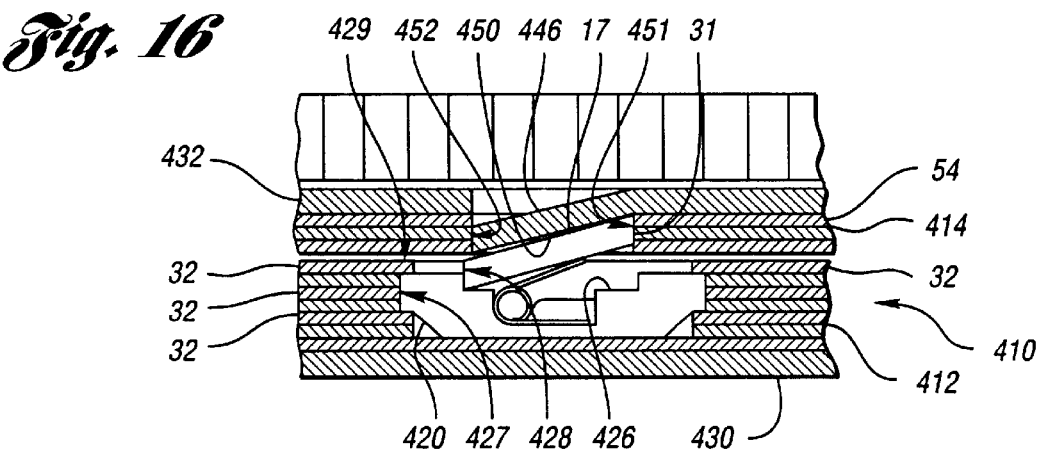
FIG. 16 is a fragmentary cross-sectional view of the fifth exemplary one-way clutch taken along line 16—16 of FIG. 14.

FIGS. 14 through 16 show a fifth exemplary one-way clutch 410 including an inner plate or first plate 412, an outer plate assembly or second plate assembly 414, and a plurality of struts 17 that operate to mechanically couple the first plate 412 to the second plate assembly 414 only when the first plate 412 rotates in a first direction 416 about an axis 418. In this example, the first plate 412 functions as a driving member, and the second plate assembly 414 functions as a driven member. Alternatively, the first plate 412 may function as the driven member, and the second plate assembly 414 may function as the driving member.

The first plate 412 includes a plurality of inserts 420 that define at least a portion of a plurality of strut pockets 426 for carrying the struts 17. Thus, the first plate 412 is configured as a pocket plate. Similar to the first plate 312, the first plate 412 further includes a plurality of laminas 32 secured together. Preferably at least two of the laminas 32 cooperate to define the remainder of each of the pockets 426. Furthermore, preferably at least two of the laminas cooperate to define a plurality of load-bearing surfaces 427, and each load-bearing surface 427 is engaged with a respective insert 420. Each of the inserts 420 functions to distribute torque-load over a respective load-bearing surface 427, and also defines a pocket engaging surface 428 that is engageable with a respective strut 17. The inserts 420 are snap-fit into the plurality of laminas 32, and further function to inhibit relative laminar movement. Furthermore, the lamina 32 that forms a clutch face 429 of the first plate 412 is configured to retain the inserts 420 within the plurality of laminas 32, as well as to retain the struts 17 within the inserts 420. Alternatively or supplementally, the inserts 420 may be secured to the plurality of laminas 32 in any suitable manner such as by welding the inserts 420 to one or more laminas 32.

Alternatively, one or more inserts (not shown) may be configured to define one or more internal surfaces of a particular strut pocket. By using such inserts in combination with a laminated clutch plate, relatively complex pocket geometries may be obtained while still providing a low cost clutch plate.

As shown in FIGS. 15 and 16, the second plate assembly 414 includes first and second members 430 and 432, respectively, which are secured together so as to sufficiently retain the first plate 412 therebetween. The second plate assembly 414 further includes a plurality of stacked laminas 54 secured to the second member 432 and disposed adjacent the first plate 412. The laminas 54 are secured together and to the second member 432 in a manner similar to that described with respect to the second plate 14.

The first member 430 has a generally radially extending portion 435 that preferably extends sufficiently radially inwardly so as to sufficiently retain lubricating fluid within the clutch 410. The first member 430 also has an axially extending flange portion 436 that defines a splined second-plate load-bearing surface 439. The load-bearing surface 439 also functions as a second-plate engaging surface that is engageable with an external arrangement (not shown) for transmitting torque-load to the external arrangement. Alternatively, the second-plate load-bearing surface 439 may be engaged with another member, such as a splined drum similar to the drum 15, which defines an engaging surface engageable with the external arrangement. The flange portion 436 also preferably has a projection 440 that engages the second member 432 for securing the members 430 and 432 together.

The second member 432 has an axially extending flange portion 442, and a generally radially extending portion 444. The flange portion 442 has a projection 445 that engages the first member 430 to further secure the members 430 and 432 together. The portion 444 has a plurality of tabs 446 disposed at angularly spaced positions about the axis 418, and the tabs 446 define at least a portion of each of a plurality of recesses or notches 450, which are alignable with the strut pockets 426. Thus, the second plate assembly 414 is configured as a notch plate assembly. Similar to the second plate 314, the laminas 54 of the second plate assembly 414 cooperate to define the remainder of the notches 450, and further cooperate to define a plurality of first notch load-bearing surfaces 451 and a plurality of second notch load-bearing surfaces 452. Each of the notch load-bearing surfaces 451 also functions as notch engaging surface for selectively engaging the second ends 31 of the struts 17 to transmit torque-load between the first plate 412 and the second plate assembly 414 when the first plate 412 is rotating relative to the second plate assembly 414 in the first direction 416 about the axis 418. Each of the second notch load-bearing surfaces 452 is engaged with a respective tab 446. The tabs 446 function to distribute torque-load over the second load-bearing surfaces 452, and further function to inhibit relative laminar movement.

Alternatively, the first plate 412 may be configured as a driven member, and the second plate assembly 414 may be configured as a strut-comprising driving member.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A clutch plate for use with a one-way clutch having a torque-load-transmitting member, the plate comprising:
   a plurality of stacked laminas, at least two of the laminas cooperating to define a load-bearing surface, the load-bearing surface being cooperable with the torque-load-transmitting member to effect one-way torque-load transfer between the torque-load-transmitting member and the plate;
   wherein the laminas are secured together to prevent relative movement of any one of the laminas with respect to another of the laminas when the torque-load is transmitted between the torque-load-transmitting member and the plate.

2. The clutch plate of claim 1 wherein each of the at least two laminas has a laterally-disposed surface, and the laterally-disposed surfaces cooperate to define the load-bearing surface.

3. The clutch plate of claim 1 further comprising an engaging member engaged with at least two of the laminas.

4. The clutch plate of claim 3 wherein the engaging member is a pin.

5. The clutch plate of claim 1 wherein a first lamina has a projection and a second lamina has a recess, and wherein the projection of the first lamina interferingly engages the recess of the second lamina.

6. The clutch plate of claim 1 wherein one lamina is welded to another lamina.

7. A one-way clutch comprising:
   a first plate having a first load-bearing surface;
   a second plate including a plurality of stacked laminas, at least two of the laminas cooperating to define a second load-bearing surface; and
   a torque-load-transmitting member that cooperates with the load-bearing surfaces to effect one-way torque-load transfer between the plates;
   wherein the laminas are secured together to prevent relative movement of any one of the laminas with respect to another of the laminas when the torque-load is transmitted between the plates.

8. The one-way clutch of claim 7 wherein each of the at least two laminas has a laterally-disposed surface, and the laterally-disposed surfaces cooperate to define the second load-bearing surface.

9. The one-way clutch of claim 7 wherein the first plate further comprises a plurality of stacked laminas, and at least two of the laminas cooperate to define the first load-bearing surface.

10. The one-way clutch of claim 7 wherein at least two of the laminas cooperate to define a second-plate load-bearing surface.

11. The one-way clutch of claim 7 further comprising an engaging member engaged with at least two of the laminas.

12. The one-way clutch of claim 11 wherein the engaging member is a pin.

13. The one-way clutch of claim 7 wherein a first lamina has a projection and a second lamina has a recess, and wherein the projection of the first lamina interferingly engages the recess of the second lamina.

14. The one-way clutch of claim 7 wherein one lamina is welded to another lamina.

15. The one way clutch of claim 7 wherein the torque-load-transmitting member is a strut, the first plate has a pocket for carrying the strut, the pocket having a pocket engaging surface engageable with the strut and cooperable with the first load-bearing surface to effect torque-load transfer therebetween, and the second plate has a notch alignable with the pocket, the notch including a notch engaging surface engageable with the strut and cooperable with the second load-bearing surface to effect torque-load transfer therebetween.

16. The one-way clutch of claim 15 wherein the second load-bearing surface and the notch engaging surface are the same.

17. The one-way clutch of claim 15 wherein at least one of the laminas defines a portion of the notch.

18. The one-way clutch of claim 15 wherein the second plate further comprises a generally planar member secured to the plurality of stacked laminas and having a greater thickness than each of the laminas, the planar member further having a tab that engages at least two of the laminas and defines an internal surface of the notch.

19. The one-way clutch of claim 14 wherein one of the laminas has a tab that extends over a laterally-disposed surface of another lamina and defines a portion of the notch.

20. The one-way clutch of claim 19 wherein the tab extends over a portion of the second load-bearing surface and defines a portion of the notch engaging surface.

21. The one-way clutch of claim 20 wherein the tab is engaged with the second load-bearing surface.

22. The one-way clutch of claim 20 further comprising an insert sandwiched between the tab and the second load-bearing surface.

23. The one-way clutch of claim 15 further comprising an insert engaged with the second load-bearing surface, the insert defining a portion of the notch engaging surface.

24. The one-way clutch of claim 23 wherein the insert further defines an additional internal surface of the notch.

25. The one-way clutch of claim 7 wherein the torque-load-transmitting member is a strut, the first plate has a notch including a notch engaging surface engageable with the strut and cooperable with the first load-bearing surface to effect torque-load transfer therebetween, and the second plate has a pocket for carrying the strut, the pocket being alignable with the notch and including a pocket engaging surface engageable with the strut and cooperable with the second load-bearing surface to effect torque-load transfer therebetween.

26. The one-way clutch of claim 25 wherein the second load-bearing surface and the pocket engaging surface are the same.

27. The one-way clutch of claim 25 wherein one of the laminas has a tab that extends over a laterally-disposed surface of another lamina and defines an internal surface of the pocket.

28. The one-way clutch of claim 27 wherein the tab extends over a portion of the second load-bearing surface and defines a portion of the pocket engaging surface.

29. The one-way clutch of claim 28 further comprising an insert sandwiched between the tab and the second load-bearing surface.

30. The one-way clutch of claim 28 wherein the tab is engaged with the second load-bearing surface.

31. The one-way clutch of claim 25 wherein the second plate further comprises an insert engaged with the second load-bearing surface and defining at least a portion of the pocket engaging surface.

32. The one-way clutch of claim 31 wherein the insert further defines an additional internal surface of the pocket.

33. The one-way clutch of claim 31 wherein the insert is retained between two laminas.

34. A one-way clutch comprising:

a first plate having a plurality of strut pockets;

a second plate including a plurality of notches alignable with the pockets, each of the notches having a notch engaging surface, the second plate further including a plurality of stacked laminas, each of the laminas having a plurality of laterally-disposed surfaces, the laterally-disposed surfaces of at least two lamina cooperating to define a lateral second-plate load-bearing surface and a plurality of lateral notch load-bearing surfaces that cooperate with the notch engaging surfaces to transmit torque-load therebetween; and a plurality of torque-load-transmitting struts disposed in the strut pockets, the struts selectively engaging the engaging surfaces to effect one-way torque-load transfer between the first and second plates;

wherein the laminas are secured together to prevent relative movement of any one of the laminas with respect to another of the laminas when the torque-load is transmitted through the second plate between at least one of the notch load-bearing surfaces and the second-plate load-bearing surface.

35. A one-way clutch comprising:

a first plate having a plurality of notches;

a second plate including a plurality of strut pockets alignable with the notches, each pocket having a pocket engaging surface, the second plate further including a plurality of laminas, each of the laminas having a plurality of laterally-disposed surfaces, the laterally-disposed surfaces of at least two laminas cooperating to define a lateral second-plate load-bearing surface and a plurality of lateral pocket load-bearing surfaces that cooperate with the pocket engaging surfaces to transmit torque-load therebetween; and a plurality of torque-load-transmitting struts disposed in the strut pockets and engageable with the pocket engaging surfaces, the struts selectively engaging the notches to effect one-way torque-load transfer between the first and second plates;

wherein the laminas are secured together to prevent relative movement of any one of the laminas with respect to another of the laminas when the torque-load is transmitted through the second plate between at least one of the pocket load-bearing surfaces and the second-plate load-bearing surface.

* * * * *